US012337448B2

(12) United States Patent
Hess et al.

(10) Patent No.: US 12,337,448 B2
(45) Date of Patent: Jun. 24, 2025

(54) HINGE-ROD REMOVAL AND INSERTION TOOL

(71) Applicant: Laitram, L.L.C., Harahan, LA (US)

(72) Inventors: David Hess, Kenner, LA (US); Stephen M. Melancon, Mandeville, LA (US); Adam E. Bannerman, Mandeville, LA (US); Rob O. Brady, Sarasota, FL (US); Jason L. Viera, Bradenton, FL (US); Erik A. Holmen, Lakewood Ranch, FL (US); Joel R. Chartier, Lakewood Ranch, FL (US)

(73) Assignee: Laitram, L.L.C., Harahan, LA (US)

( * ) Notice: Subject to any disclaimer, the term of this patent is extended or adjusted under 35 U.S.C. 154(b) by 391 days.

(21) Appl. No.: 17/784,895

(22) PCT Filed: Jan. 7, 2021

(86) PCT No.: PCT/US2021/012413
§ 371 (c)(1),
(2) Date: Jun. 13, 2022

(87) PCT Pub. No.: WO2021/154471
PCT Pub. Date: Aug. 5, 2021

(65) Prior Publication Data

US 2023/0009578 A1 Jan. 12, 2023

Related U.S. Application Data

(60) Provisional application No. 63/076,018, filed on Sep. 9, 2020, provisional application No. 62/966,212, filed on Jan. 27, 2020.

(51) Int. Cl.
*B25B 27/00* (2006.01)
*B25B 27/04* (2006.01)

(52) U.S. Cl.
CPC .................................. *B25B 27/04* (2013.01)

(58) Field of Classification Search
CPC ......... B25B 27/00; B25B 27/04; B25B 31/00; B25B 13/00; B25B 15/00
See application file for complete search history.

(56) References Cited

U.S. PATENT DOCUMENTS 4,116,037 A 9/1978 Honeycutt
4,238,862 A 12/1980 Leatherman
(Continued)

FOREIGN PATENT DOCUMENTS

CN 107995884 A 5/2018
DE 3544419 A1 6/1987
(Continued)

OTHER PUBLICATIONS

"Metalworking Magnets and More" catalog, pp. 1, 2, 37, and 48, Industrial Magnetics, Inc., Boyne City, MI, Apr. 2019.
(Continued)

*Primary Examiner* — Lee D Wilson
(74) *Attorney, Agent, or Firm* — James T. Cronvich

(57) ABSTRACT

A hinge-rod removal and insertion tool for opening and closing modular conveyor belts during installation and servicing. The tool is a pliers with jaws forming a split aperture. The jaws open to admit the end of the hinge rod of a modular conveyor belt. The jaws close to grasp the hinge rod so that it can be pulled from the belt. A head at the distal end of the jaws is used to push a hinge rod back into the belt. The tools have lift hooks to lift a section of belt to gain access to the ends of the hinge rods.

22 Claims, 6 Drawing Sheets

(56) References Cited

U.S. PATENT DOCUMENTS

| | | | | |
|---|---|---|---|---|
| 4,386,542 | A * | 6/1983 | Verna | B25B 7/02 81/424.5 |
| 5,611,519 | A | 3/1997 | Garcia | |
| 7,226,047 | B1 * | 6/2007 | Beauchamp | B25B 7/04 29/272 |
| 9,555,521 | B2 * | 1/2017 | St. Gelais | B25B 7/02 |
| 10,328,552 | B2 * | 6/2019 | Forseth | B25B 5/142 |
| 11,926,024 | B1 * | 3/2024 | Packer | B25B 7/123 |
| 2008/0216548 | A1 | 9/2008 | Steiner et al. | |
| 2011/0154958 | A1 | 6/2011 | Wang | |
| 2019/0358781 | A1 * | 11/2019 | Valento | B25B 7/123 |
| 2023/0009578 | A1 * | 1/2023 | Hess | B25B 7/02 |

FOREIGN PATENT DOCUMENTS

| | | | |
|---|---|---|---|
| EP | 0657254 | B1 | 12/1997 |
| KR | 20-2009-0000290 | U | 1/2009 |
| TW | 453259 | U | 9/2001 |
| WO | 2015100323 | A1 | 7/2015 |

OTHER PUBLICATIONS

Extended European Search Report, European Patent Application No. 21747671.2, mailed Dec. 22, 2023, European Patent Office, Munich, Germany.

* cited by examiner

HINGE-ROD REMOVAL AND INSERTION TOOL

BACKGROUND

The invention relates generally to power-driven conveyors and more particularly to hand tools for removing and inserting hinge rods in modular conveyor belts.

Modular plastic conveyor belts are constructed of a series of rows of one or more belt modules linked together end to end by plastic hinge rods extending through interleaved link ends of adjacent belt rows. When modules break or wear, they must be replaced. To do so requires that the belt be opened by removing hinge rods from the belt rows containing the broken or worn modules, removing the broken or worn modules, and re-inserting the removed hinge rods or inserting new ones. Conveyor belts in hygienic applications must be cleaned regularly. In many cases the belt is removed from the conveyor frame for cleaning. The belt must first be opened by extracting a hinge rod at one of the hinge joints. Once opened, the belt is removed for cleaning. Removing a hinge rod typically involves grasping one end of the rod with a tool, such as a standard pliers, and pulling the rod out of the belt. Often the hinge rod must be bent to clear rod-retention structure in the edge of the belt. The grasping, prying, and pulling with a standard tool can result in damage to the hinge rod or to the belt edge. And damage can occur when the hinge rod is inserted in the belt, especially if heavy forces or impacts are used to push the rod into the belt. The damage to the rod or the belt can result in broken rod and belt shards that can contaminate conveyed products.

SUMMARY

One version of a hinge-rod tool embodying features of the invention comprises a pliers having a longitudinal axis and two opposing jaws and two respective handles and an intermediate pivot portion defining a pivot axis perpendicular to the longitudinal axis. The two opposing jaws extend from the pivot portion to distal tips. The jaws have opposing inner faces spaced apart across a gap between the distal tips and the pivot portion. A platform attached at the distal tips of the two jaws borders the gap. The platform includes a first wing having a first cylindrical aperture extending through the platform at a first side edge of the platform. The platform is split into two platform portions through a first cylindrical aperture through the platform. Each of the portions is attached to a respective jaw so that the two platform portions are separated when the jaws are opened and in contact at the split when the jaws are closed.

Another version of a hinge-rod tool embodying features of the invention comprises a first member having a first handle, a first jaw with a first inner face, and a first pivot portion between the first handle and the first jaw and a second member having a second handle, a second jaw with a second inner face, and a second pivot portion between the second handle and the second jaw. The second jaw extends in length from the second pivot portion to a second tip. A pin extends through the first and second pivot portions to form a pivot about which the first and second members pivot perpendicular to a longitudinal axis of the hinge-rod tool. A first lip extends from the first inner face at the first tip toward the second tip to a first stop face. A second lip extends from the second inner face at the second tip toward the first tip to a second stop face. The first stop face and the second stop face are in contact when the hinge-rod tool is closed. A first lateral extension of the first lip has a first concave face, and a second lateral extension of the second lip has a second concave face. The first and second concave faces form a wall bounding a first cylindrical aperture extending along a first central axis through the first and second lateral extensions when the hinge-rod tool is closed. The first central axis is parallel to the longitudinal axis or forms an acute angle with the longitudinal axis on the pivot side of the first cylindrical aperture.

DETAILED DESCRIPTION

Figure 1:
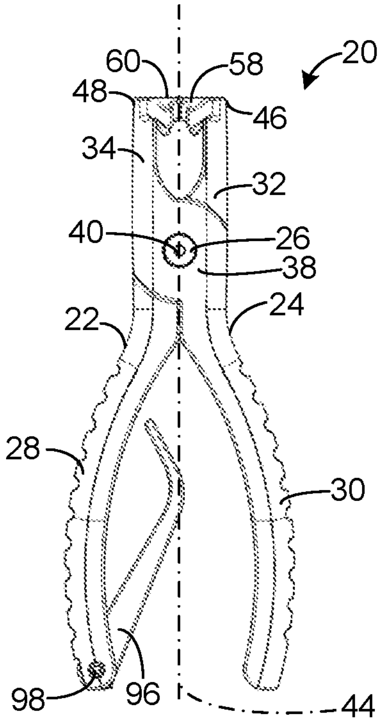
FIG. 1 is a front elevation view of one version of a hinge-rod removal and insertion tool embodying features of the invention.
Figure 2:
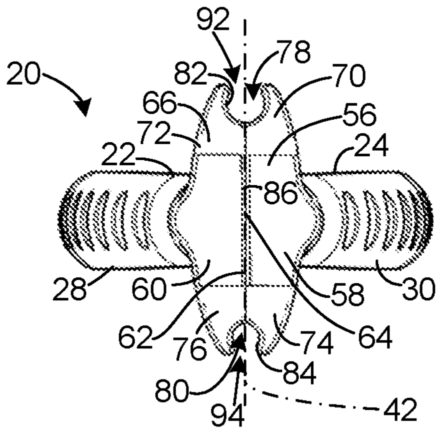
FIG. 2 is an enlarged top plan view of the tool of FIG. 1.
Figure 3:
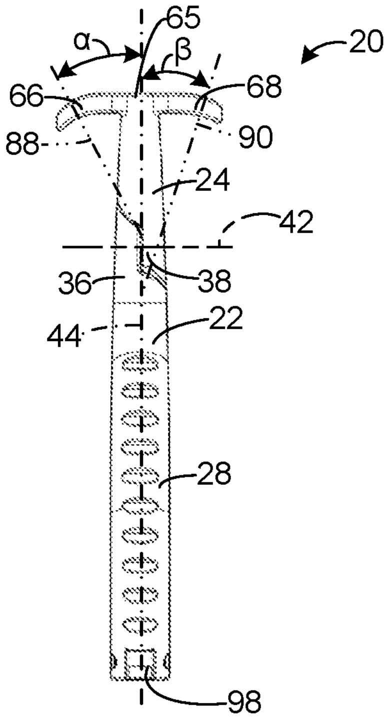
FIG. 3 is a side elevation view of the tool of FIG. 1.

One version of a hinge-rod removal and insertion tool embodying features of the invention is shown in FIGS. 1-4. The hinge-rod tool 20 is a special-purpose pliers constructed of two elongated members 22, 24 pivotably joined at a pivot 26, or fulcrum. Each member 22, 24 includes a handle 28,

30 at one end and opposing jaws 32, 34 at the other end. Intermediate pivot portions 36, 38 pivotably join the handle 28, 30 to the jaws 32, 34. A pivot pin 40 through the pivot portions 36, 38 forms the pivot 26 about which the two members 22, 24 pivot about a pivot axis 42, perpendicular to a longitudinal axis 44 of the tool 20.

The jaws 32, 34 extend from the pivot portions 36, 38 to distal tips 46, 48. Opposing inner faces 50, 52 of the jaws 32, 34 are spaced apart across a gap 54 between the distal tips 46, 48 and the pivot portions 36, 38. A split platform 56 consists of two platform portions—lips 58, 60 that extend toward each other from the opposing inner faces 50, 52 at the tips 46, 48 of the jaws 32, 34 to stop faces 62, 64. The stop faces 62, 64 are in contact when the jaws 32, 34 are closed as in FIGS. 1-4. The jaws 32, 34 are open when the two stop faces 62, 64 are separated. The platform 56 borders the gap 54 on one side. When closed, the platform 56 forms a head 65 that can be used to push hinge rods.

The platform 56 has wings 66, 68 formed by lateral extensions 70, 72, 74, 76 of the two lips 58, 60 in opposite lateral directions parallel to the pivot axis 42. Cylindrical apertures 78, 80 bounded by concave faces, or walls 82, 84, extend through the wings 66, 68. A seam 86 along which the platform 56 is split extends through the apertures 78, 80. The wings 66, 68 curve outward down toward the pivot axis 42 so that each cylindrical aperture 78, 80 has a central axis 88, 90 that forms an acute angle α, β with the tool's longitudinal axis 44 on the pivot side of the apertures. The aperture walls 82, 84 have mouths 92, 94 that open onto distal side edges of the platform 56. But the walls 82, 84 could alternatively extend 360° around the apertures 78, 80, instead of about 315° as in FIG. 2. For example, the walls 82, 84 could extend to the mouths 92, 94 over a circular arc of ranging from about 270° to 360°. As FIG. 2 also shows, the second aperture 80 is smaller than the first aperture 78 when the tool 20 is closed. And, although the cylindrical apertures 78, 80 are shown to have a circular cross section, they could have a non-circular cross section. So, as used to describe the tools in this application, the term "cylindrical aperture" is not limited to a circular cylindrical aperture or to an aperture with closed walls.

Figure 4:
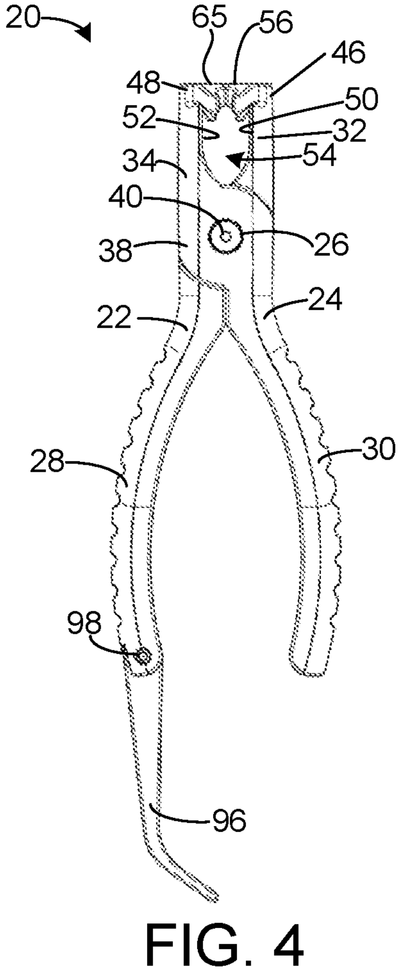
FIG. 4 is a front elevation view of the tool of FIG. 1 with a belt lift hook shown in an extended position.

As FIGS. 1 and 4 show, a lift hook 96 is pivotably attached to an end of one of the handles 28 at a pivot 98. The lift hook 96 is pivotable from a stowed position between the handles 28, 30 in FIG. 1 to a lifting position in FIG. 4, in which the bent hook can be used as a pry bar to lift, for example, a portion of a conveyor belt for better access to the hinge rods.

Another version of hinge-rod removal and insertion tool embodying features of the invention is shown in FIGS. 5-8. In this version the hinge-rod tool 100 has two separable members 102, 104 joined at pivot portions 106, 108. The pivot portion 108 has a T-shaped pivot-pin projection 110 standing up from a base 112 of the member 104. The pivot portion 106 of the other member 102 has a slot 114 sized to admit the top 116 of the T-shaped projection 110 only when the jaws 118, 120 are oriented in the single opened position shown in FIG. 5. In that position the member 102 with the slot 114 can be lowered onto the other member 104 with the T-shaped projection 110 passing through the slot. Once the T-shaped projection 110 clears the slot 114, the tool 100 can be moved toward the closed position shown in FIG. 6. As long as the projection 110 is not aligned with the slot 114, as in all other opened positions and the closed position, the two members 102, 104 are held pivotably together. The slot 114 is formed in a concave recess 119 in the pivot portion 106 of the member 102. The top of the T-shaped projection 110 has a convex underside 122 whose curvature complements that of the concave recess 119 so that the two members 102, 104 can pivot smoothly between the closed position and open positions.

Like the hinge-rod tool 20 of FIGS. 1-4, the tool 100 of FIGS. 5-8 has a split platform 124 at the distal tip of the jaws 118, 120. But the platform 124 in this version differs in that: (1) it has only one cylindrical aperture 126; (2) it has three dimples in the platform's head 127—one dimple 128 opposite the aperture and a pair of opposing dimples 130, 132, each associated with a respective jaw 118, 120. The opposing dimples 130, 132 are generally circular. Only the dimple 128 opposite the aperture 126 is split by the seam 134 between two platform portions 136, 138. The split aperture 126 is formed in the end of a long nose 139 extending laterally from one side of the split platform 124. The split dimple 128 is formed in a short nose 141 extending laterally from the opposite side of the split platform 124. The short nose 141 has an outer end that cuts the end of the split dimple 128 opposite the split aperture 126 short of a complete closed circle so that the split dimple opens onto the outer end of the nose.

Figure 9A:
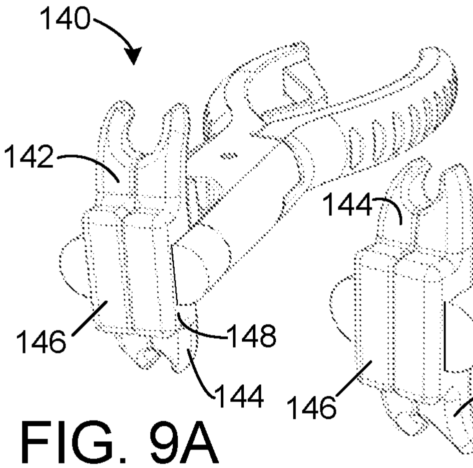
FIGS. 9A and 9B are bottom and top axonometric views of another version of a hinge-rod removal and insertion tool embodying features of the invention.
Figure 9B:
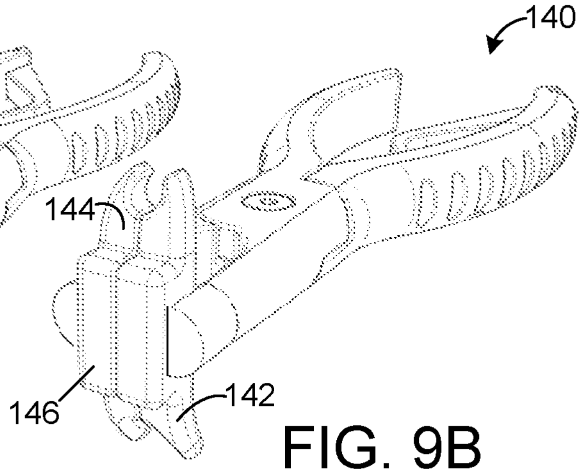

Another version of a hinge-rod tool is shown in FIGS. 9A and 9B. The tool 140 has wings 142, 144 that are recessed below an outer face 146 of a split platform 148. In other respects the tool is similar to the tool 20 of FIG. 1.

Figure 10:
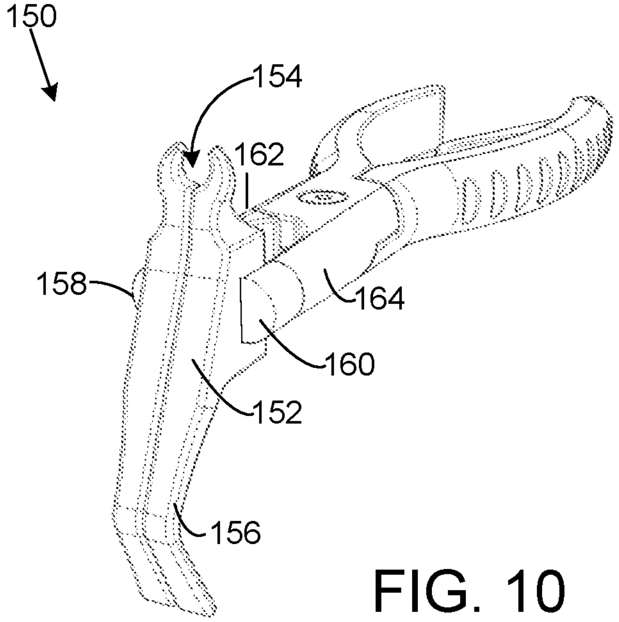
FIG. 10 is an axonometric view of another version of a hinge-rod removal and insertion tool embodying features of the invention including a belt lift hook at the jaws.

Yet another version of a hinge-rod tool is shown in FIG. 10. The tool 150 has a split platform 152 with a cylindrical aperture 154 at one side edge and a split lift hook 156 at the opposite side. The hook 156 extends outward and away from the distal ends 158, 160 of the jaws 162, 164. The bent hook 156 can be used as a pry bar to lift a conveyor belt for better access to the hinge rods.

Figure 5:
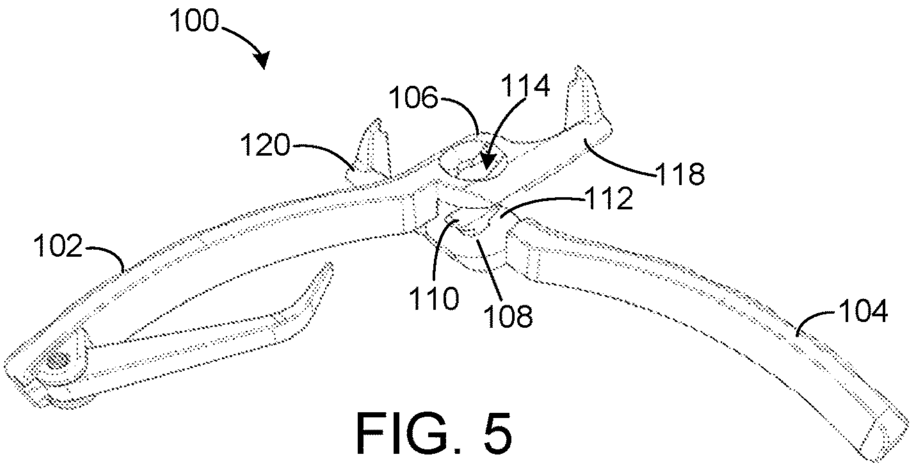
FIG. 5 is an exploded view of another version of a hinge-rod removal and insertion tool embodying features of the invention.
Figure 6:
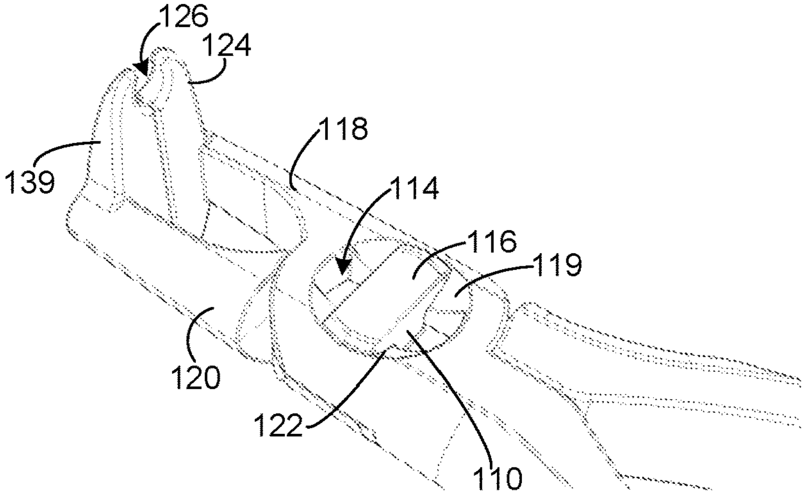
FIG. 6 is an enlarged isometric view of the pivot and jaw portions of the tool of FIG. 5.
Figure 7:
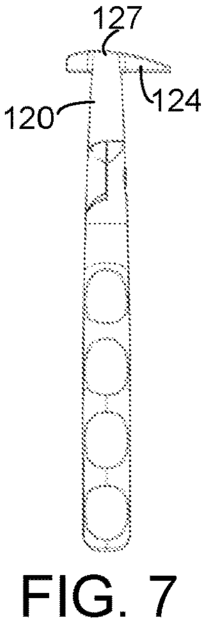
FIG. 7 is a side elevation view of the tool of FIG. 5.
Figure 8:
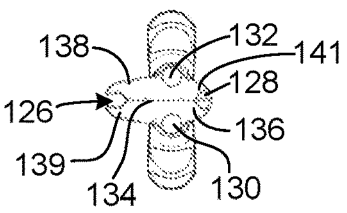
FIG. 8 is a top plan view of the tool of FIG. 7.
Figure 11:
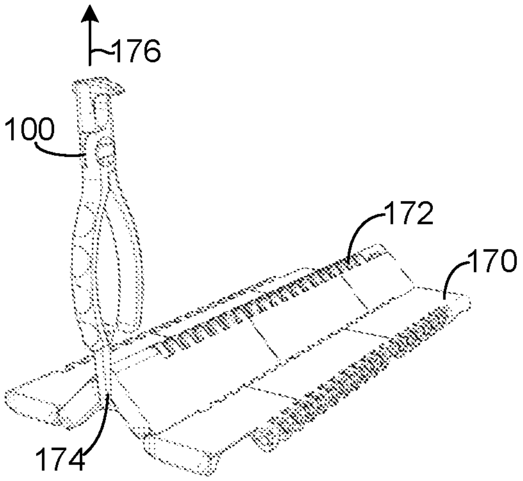
FIG. 11 is a perspective view of the hinge-rod removal and insertion tool of FIG. 5 shown lifting a section of a conveyor belt with its lift hook.
Figure 12:
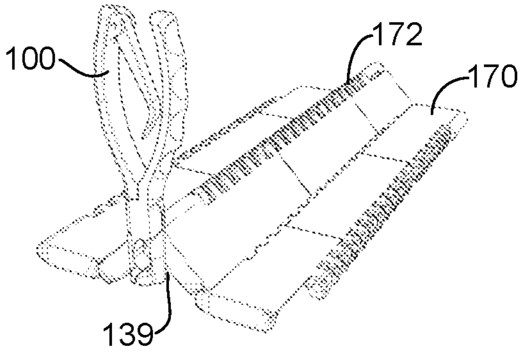
FIG. 12 is a perspective view of the hinge-rod removal and insertion tool of FIG. 5 shown lifting a section of a conveyor belt with its nose.

FIGS. 11 and 12 show the hinge-rod tool 100 of FIG. 5 lifting a section of a conveyor belt 170 at a hinge joint 172. In FIG. 11 the tool's lift hook 174 is pivoted out of its retracted position to its lifting position and its hook end is inserted under the belt 170. The hinge-rod tool 100 is lifted, as indicated by the arrow 176, to lift a section of the belt 170 away from belt-supporting structure (not shown) to provide access to the lifted hinge joint 172 and its hinge rod. In FIG. 12 the lifting is achieved with the hinge-rod tool's nose 139 inserted under the conveyor belt 170 at the hinge joint 172. The hinge-rod tools 20, 140 of FIGS. 1 and 9A could be used in the same way to lift a belt section.

Figure 13:
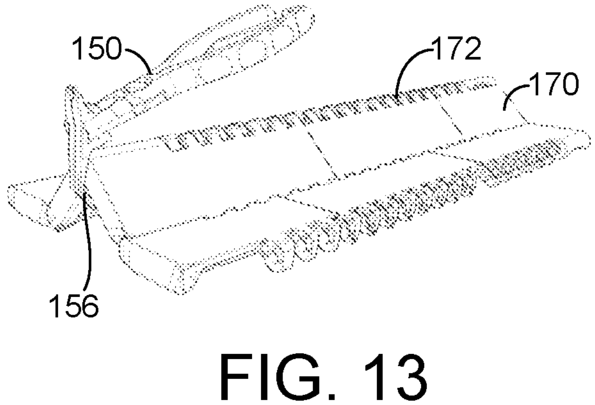
FIG. 13 is a perspective view of the hinge-rod removal and insertion tool of FIG. 10 shown lifting a section of a conveyor belt.

In FIG. 13 the hinge-rod tool 150 of FIG. 10 is shown lifting a section of a conveyor belt 170 with its split lift hook 156 inserted under the belt at a hinge joint 172.

Figure 14A:
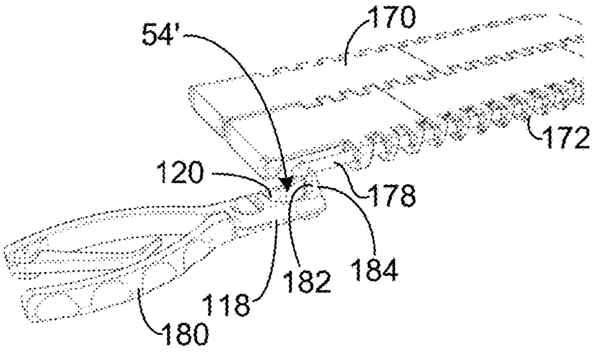
FIGS. 14A and 14B are perspective views of another version of a hinge-rod removal and insertion tool embodying features of the invention shown grasping and pulling a headless hinge rod from a conveyor belt.
Figure 14B:
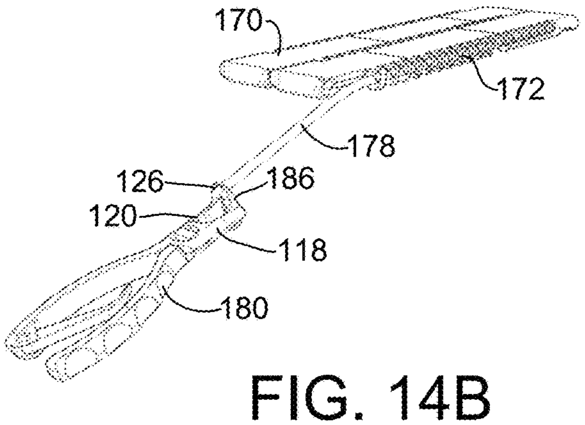

FIGS. 14A and 14B show another version of a hinge-rod tool 180 grasping and removing a headless hinge rod 178 from the hinge joint 172 of a conveyor belt 170. The hinge-rod tool 180 is similar to the hinge-rod tool 100 of FIGS. 5-8, differing only in that the underside 182 of the long nose 184 of the split platform 186 is concavely curved, instead of flat. The tool's jaws 118, 120 are first opened to admit the end of the hinge rod 178 into the split aperture 126. The jaws 118, 120 are then closed to grasp the hinge rod 178 in the aperture 126. With the hinge rod 178 firmly grasped by the jaws 118, 120, the tool 180 can then pull the rod from the hinge joint 172. The gap 54' between the jaws 118, 120 allows the tool's users to see the ends of the hinge rods to help them position the tool on the rods.

Figure 15A:
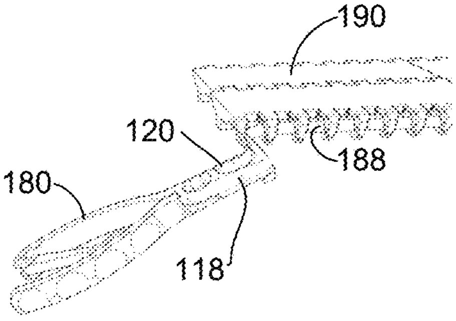
FIG. 15A is a perspective view of the hinge-rod removal and insertion tool of FIGS. 14A and 14B shown grasping a headed hinge rod.
Figure 15B:
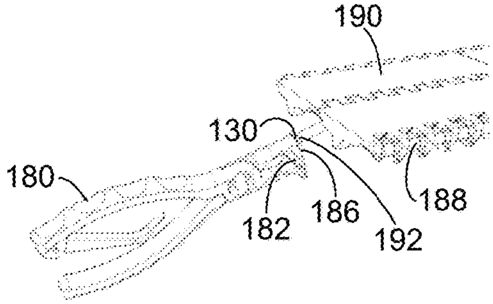
FIG. 15B is a perspective view of the hinge-rod removal and insertion tool of FIG. 15A shown pushing a headed hinge rod into a conveyor belt.

FIG. 15A shows the hinge-rod tool 180 removing a headed hinge rod 188 from a conveyor belt 190 in a similar way. The hinge rod 188 is grasped in the jaws 118, 120 just below the rod head and bent away from occluding belt structure so that the tool 180 can be used to pull the hinge rod from the belt 190. The hinge-rod tool 180 can be used to push the hinge rod 188 into the conveyor belt 190 as shown in FIG. 15B. One or the other of the completely circular, unsplit dimples 130, 132 (FIG. 8) is positioned to receive the domed head 192 of the hinge rod 188. The seating of the rod head 192 in the dimple 130 decreases the tendency of the rod 188 to slip from the tool's platform 186 as the rod is being pushed into the belt 190. The concavity of the underside 182 provides a radius conforming to the thumbs of users of the tool 180 to make rod insertion more comfortable.

Figure 16:
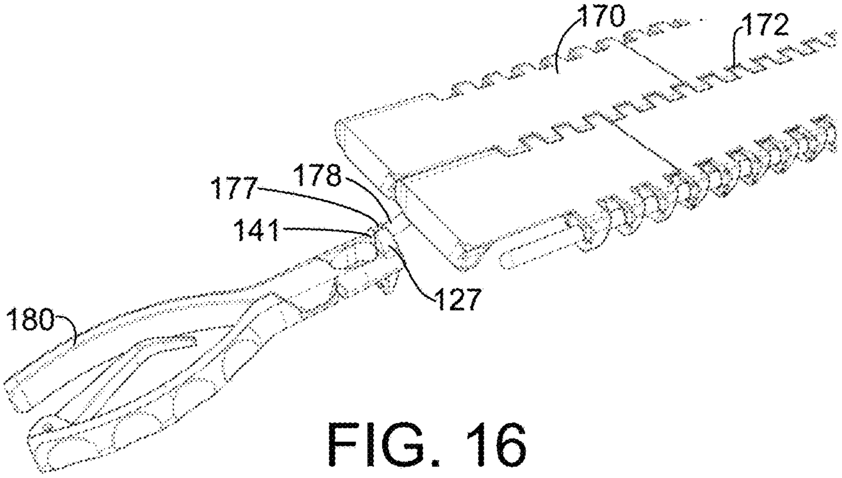
FIG. 16 is a perspective view of the hinge-rod removal and insertion tool of FIGS. 14A and 14B shown pushing a headless hinge rod into a conveyor belt.

FIG. 16 shows the hinge-rod tool 180 being used to push a headless hinge rod 178 into the hinge joint 172 of a conveyor belt 170. The end of the hinge rod 178 is received in one of the dimples (128, 130, 132 of FIG. 8) in the head 127 of the tool 180 to help retain the rod end without slipping as the rod is pushed into the hinge joint 172. The split dimple 128 (FIG. 8) on the short nose 141 of the tool 180 is especially useful with headless hinge rods. The tool's short nose 141, whose outer end 177 does not extend significantly beyond the circumference of the hinge rod 178 when its end is received in the dimple 128, avoids contact with belt structure and consequent damage to the belt. The other hinge-rod tools could also be used to insert hinge rods into position in conveyor belts with their heads. And the heads could optionally be provided with dimples to avoid slipping.

Figure 17:
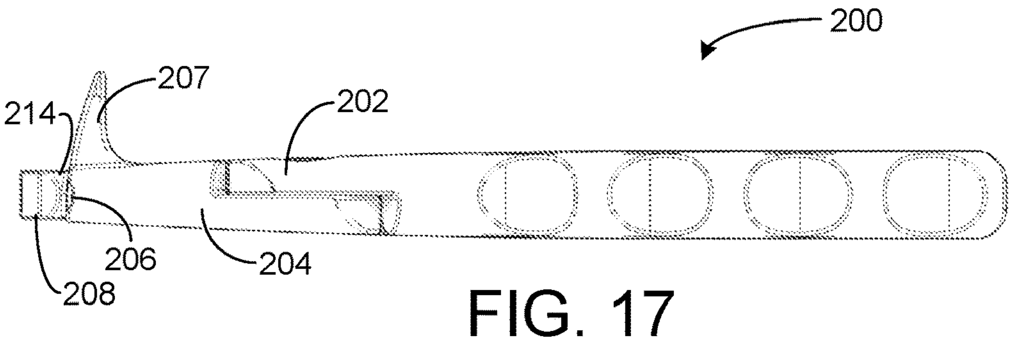
FIG. 17 is a side view of another version of a hinge-rod removal and insertion tool having a pry tab.
Figure 18:
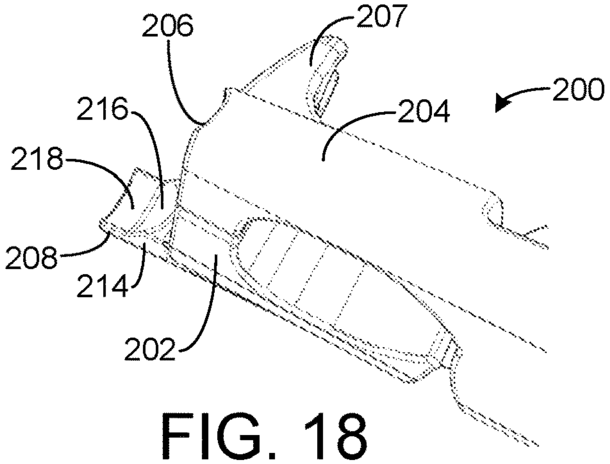
FIG. 18 is an enlarged view of the jaw end of the hinge-rod removal and insertion tool of FIG. 17
Figure 19:
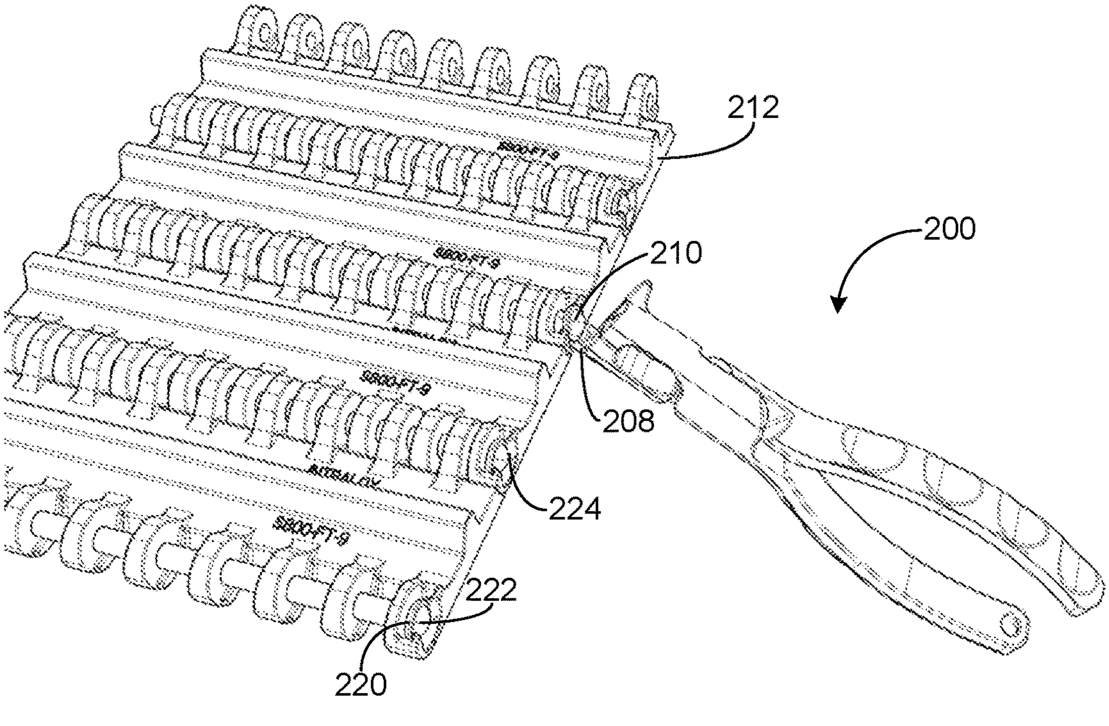
FIG. 19 is an isometric view of the hinge-rod removal and insertion tool of FIG. 17 prying a headed hinge rod from a conveyor belt.

Another version of a hinge-rod tool is shown in FIGS. 17 and 18. The tool 200 is similar to the other tools in that it has a pair of pivotable jaws 202, 204 terminating in a split platform 206 at the distal tip of the jaws at the head of the tool. A split nose 207 extends outward from the distal ends of the jaws 202 generally parallel to the tool's pivot axis. A protrusion extending outward of the split platform 206 from the distal tip of one of the jaws 202 forms a pry tab 208 that is useful in removing headed hinge rods 210 from the hinge of a conveyor belt 212 as shown in FIG. 19. The pry tab 208 extends generally perpendicular to the nose 207 and the platform 206; i.e. parallel to the tool's longitudinal axis when the tool is closed. The pry tab 208 has a base 214 with a curved concave face 216 that tapers down to a scoop 218. The scoop 218, which forms a portion of a cylinder, is thin enough to fit between the edge of the conveyor belt 212 and the flange 220 ringing the domed head 222 of the hinge rod 210. The scoop 218 is also thick enough to have the strength to bend the hinge rod 210 to disengage the flanges 220 at its head 222 from snap-in rod-head retention structure 224 in the belt edge. Once the head 222 is clear of the belt edge, the rod 210 is grabbed behind the head by the hinge-rod tool's split nose 207 and pulled from the belt's hinge. The curved concave face 216 accommodates the domed head 222 of the hinge rod 210. Like the hinge-rod tool 100 of FIG. 8, the hinge-rod removal and insertion tool 200 has dimples formed in its platform 206 to aid in pushing the hinge rod into place in the belt's hinge.

What is claimed is:

1. A hinge-rod tool comprising:
- a pliers having a longitudinal axis and two opposing jaws and two respective handles and an intermediate pivot portion defining a pivot axis perpendicular to the longitudinal axis;
- wherein the two opposing jaws extend from the pivot portion to distal tips and include:
  - opposing inner faces spaced apart across a gap between the distal tips and the pivot portion;
  - a platform attached at the distal tips of the two jaws and bridging the gap between the opposing inner faces when the jaws are closed;
  - wherein the platform includes a first wing having a first cylindrical aperture extending through the platform at a first side edge of the platform, the first cylindrical aperture having a central axis;
  - wherein the platform is split into two platform portions through the first cylindrical aperture, each of the portions attached to a respective jaw so that the two platform portions are separated when the jaws are opened and in contact at the split when the jaws are closed;
  - a pry tab extending from the distal tip of one of the jaws.

2. The hinge-rod tool of claim 1 wherein the first cylindrical aperture has a mouth opening onto the first side edge of the platform when the jaws are closed.

3. The hinge-rod tool of claim 1 wherein the platform includes a second wing having a second cylindrical aperture extending through the platform at an opposite second side edge of the platform, wherein the platform is split through the second cylindrical aperture.

4. The hinge-rod tool of claim 3 wherein the second cylindrical aperture is smaller than the first cylindrical aperture when the jaws are closed.

5. The hinge-rod tool of claim 1 wherein the first wing curves toward the pivot portion out to the first side edge of the platform so that the central axis of the first cylindrical aperture is oblique to the longitudinal axis of the hinge-rod tool.

6. The hinge-rod tool of claim 1 comprising a lift hook pivotally attached to one of the handles.

7. The hinge-rod tool of claim 1 wherein the first cylindrical aperture is circular in cross section.

8. The hinge-rod tool of claim 1 wherein the platform includes a second wing having a lift hook extending to an opposite second side edge of the platform, wherein the platform is split through the lift hook.

9. The hinge-rod tool of claim 1 wherein the pivot portion includes a T-shaped projection and a slot sized to admit the top of the T-shaped projection only when the jaws are oriented in a single opened position so that the pliers can be assembled or disassembled, wherein the T-shaped projection is locked in place in the pivot portion when the jaws are oriented in any other position.

10. The hinge-rod tool of claim 1 wherein the platform includes at least one dimple in the platform opposite the gap.

11. The hinge-rod tool of claim 1 wherein the platform includes a second wing having a dimple in the platform at an opposite second side edge of the platform opposite the gap, wherein the platform is split through the dimple.

12. The hinge-rod tool of claim 1 wherein the platform has a concave underside.

13. The hinge-rod tool of claim 1 wherein the pry tab has a distal scoop.

14. A hinge-rod tool comprising:
- a first member including:
  - a first handle;
  - a first jaw having a first inner face;
  - a first pivot portion between the first handle and the first jaw;
  - wherein the first jaw extends in length from the first pivot portion to a first tip;
- a second member including:
  - a second handle;
  - a second jaw having a second inner face;

a second pivot portion between the second handle and the second jaw;

wherein the second jaw extends in length from the second pivot portion to a second tip;

a pin extending through the first and second pivot portions to form a pivot about which the first and second members pivot perpendicular to a longitudinal axis of the hinge-rod tool;

a first lip extending from the first inner face at the first tip toward the second tip to a first stop face;

a second lip extending from the second inner face at the second tip toward the first tip to a second stop face, wherein the first stop face and the second stop face are in contact when the hinge-rod tool is closed;

a first lateral extension of the first lip having a first concave face;

a second lateral extension of the second lip having a second concave face;

wherein the first and second concave faces form a wall bounding a first cylindrical aperture extending along a first central axis through the first and second lateral extensions when the hinge-rod tool is closed; and wherein the first central axis is parallel to the longitudinal axis or forms an acute angle with the longitudinal axis on the pivot side of the first cylindrical aperture.

15. The hinge-rod tool of claim 14 wherein the wall extends less than 360° around the first cylindrical aperture so that a mouth is formed in the wall when the hinge-rod tool is closed.

16. The hinge-rod tool of claim 14 comprising:

a third lateral extension of the first lip in the opposite direction of the first lateral extension and having a third concave face;

a fourth lateral extension of the second lip in the opposite direction of the second lateral extension and having a fourth concave face;

wherein the third and fourth concave faces form a second wall bounding a second cylindrical aperture extending along a second central axis through the third and fourth lateral extensions when the hinge-rod tool is closed; and wherein the second central axis is parallel to the longitudinal axis or forms an acute angle with the longitudinal axis on the pivot side of the second cylindrical aperture.

17. The hinge-rod tool of claim 16 wherein the second cylindrical aperture is smaller than the first cylindrical aperture.

18. The hinge-rod tool of claim 14 comprising a lift hook pivotally attached to the first handle.

19. The hinge-rod tool of claim 14 wherein the first and second inner faces are spaced apart across a gap when the hinge-rod tool is closed.

20. The hinge-rod tool of claim 14 wherein the first cylindrical aperture is circular in cross section.

21. The hinge-rod tool of claim 14 further comprising a pry tab extending from the first tip of the first jaw in a direction parallel to the longitudinal axis of the hinge-rod tool when closed.

22. The hinge-rod tool of claim 21 wherein the pry tab terminates in a cylindrical scoop at an outermost end distal from the first tip of the first jaw.

* * * * *